United States Patent
Wehner et al.

(10) Patent No.: US 6,216,983 B1
(45) Date of Patent: Apr. 17, 2001

(54) EPHEMERIS/ATTITUDE REFERENCE DETERMINATION USING COMMUNICATIONS LINKS

(75) Inventors: James W. Wehner, Torrance; Richard B. Sherwood, Palos Verdes Estates, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/340,696

(22) Filed: Jun. 29, 1999

(51) Int. Cl.[7] .................................................. B64G 1/24
(52) U.S. Cl. ........................ 244/158 R; 244/176; 701/13
(58) Field of Search ............................... 244/158 R, 176, 244/164, 171; 701/13, 226

(56) References Cited

U.S. PATENT DOCUMENTS

| | | | |
|---|---|---|---|
| 5,107,434 | * 4/1992 | Paluszek | 244/164 |
| 5,717,404 | * 2/1998 | Malla | 455/12.1 |
| 5,731,786 | * 3/1998 | Abraham et al. | 342/357 |
| 5,862,495 | * 1/1999 | Small et al. | 244/164 |
| 5,935,196 | * 8/1999 | Brodie et al. | 244/158 R |
| 6,049,304 | * 4/2000 | Rudel et al. | 701/213 |

* cited by examiner

*Primary Examiner*—Galen L. Barefoot
(74) *Attorney, Agent, or Firm*—Michael S. Yatsko (57) ABSTRACT

A system (300) for determining the ephemeris and attitude for a spacecraft includes ephemeris and attitude determining subsystems (700, 800) that obtain ephemeris data (708, 806) for one or more reference spacecraft crosslinked to the spacecraft. Crosslink sensor pointing information (706, 802) is obtained for the crosslink sensors. The satellite ephemeris and attitude (712, 810) are then calculated with ephemeris and attitude determination algorithms (702, 804) based on the ephemeris data (708, 806) and crosslink sensor pointing information (706, 802). Other available information, such as stored results of previous measurements and calculations, time (710, 808), spacecraft attitude (704), information from non-crosslink sensors and ranging information may be used to enhance the accuracy or decrease the complexity of the ephemeris calculations.

27 Claims, 9 Drawing Sheets

EPHEMERIS/ATTITUDE REFERENCE DETERMINATION USING COMMUNICATIONS LINKS

BACKGROUND OF THE INVENTION

The present invention generally relates to satellite ephemeris and attitude determination. More specifically, the present invention relates to utilizing communications link pointing information and knowledge of the ephemeris of other satellites to determine satellite ephemeris and attitude.

Attitude and orbit determination and control are important aspects of most satellite systems. The satellite Attitude Determination and Control Subsystem (hereinafter "ADCS") measures and maintains the spacecraft's attitude (or orientation about its center of mass). The ADCS stabilizes the vehicle and orients it in desired directions during the mission despite the external disturbance torques acting on it. This first requires the spacecraft to determine its attitude using sensors. External references must be used to determine the absolute attitude of the spacecraft. The external references may include the Sun, the Earth's infrared horizon, magnetic fields, and the stars. To maintain attitude reference between calculations based on external references, the satellite may carry inertial sensors such as gyroscopes. Next, the ADCS must control the spacecraft's attitude using actuators, such as reaction wheels, control-moment gyros, magnetic torquers, and gas jets or thrusters.

Similarly, the guidance and navigation function, also known as the Orbit Determination and Control Subsystem (hereinafter "ODCS"), measures and controls the position of the spacecraft's center of mass. The position (and optimally the velocity) of a spacecraft as a function of time is commonly referred to as the satellite ephemeris. The ODCS determines the spacecraft's position in space using sensors such as GPS receivers. External references must be used to determine the absolute position of the spacecraft. The external references may include the Sun and the Earth's infrared horizon with precision clocks, or ground reference points and precision clocks. Next, the ODCS must control the orbital position of the spacecraft using gas jets or thrusters. Orbital control is required whenever a satellite is trying to maintain a desired orbit. Orbital control is needed to overcome orbit perturbations and may be required for any orbit, including Low-Earth Orbit (hereinafter "LEO") and geosynchronous Earth Orbit (hereinafter "GEO") stationkeeping. Maintaining relative satellite positions, such as in constellation maintenance, also requires orbital control.

Navigation provides the information necessary to determine a satellite's ephemeris, just as attitude determination provides the information necessary for attitude control. Guidance refers to the means of adjusting a satellites position. Thus, a requirement for orbit control will ordinarily result in a corresponding requirement for guidance and navigation. Ephemeris information may also be used in processing data from the payload. Irrespective of orbit control, there is often a need to point an antenna or instrument in some direction to perform communication or observation tasks. For example, in satellite systems designed to track objects, knowledge of the positions of the satellites sensing the objects being tracked may be critical. Since the position of an object being tracked is ultimately derived from the position in space of the satellite(s) sensing the object, the accuracy of the tracking is directly dependent upon the accuracy with which the position of the satellite(s) is known.

Forces act on the satellite to continually move it away from the nominal attitude and orbit. There are short-term orbital variations (also know as "perturbations") that are periodic with a period less than or equal to the orbital period, and there are long-period perturbations, which are orbital variations with a period greater than the orbital period. There are also secular variations, which represent a linear orbital variation that increases over time. The primary forces that perturb a satellite orbit arise from third bodies such as the Sun and the Moon, the non-spherical mass distribution of the Earth, atmospheric drag, and solar radiation pressure.

In the past, guidance and navigation have involved intense ground-operation activity. However, on-board computers have become computationally powerful, lightweight, and energy efficient. Satellites now carry advanced on-board computers and are capable of performing autonomous guidance and navigation. Another important factor enabling a move to autonomous navigation is the development of accurate on-board sensors, such as GPS receivers. The principal problem remaining is that of providing the on-board computers with ephemeris and attitude data from alternate sources that have high reliability and with improved economic in terms of both cost and weight.

Many autonomous navigation methods currently exist. For example, the Microcosm Autonomous Navigation System uses observations of the Earth, Sun, and Moon, and determines orbit, attitude, ground look point, and Sun direction. Its typically accuracy is approximately 100 m–400 m in a LEO system. Another navigational aid is the Space Sextant, which uses the angle between particular stars and the Moon's limb. The space sectant determines both orbit and attitude, and its typical accuracy is 250 m. Stellar refraction is another navigation system and uses the refraction of starlight passing through the atmosphere to determine both orbit and attitude. Its typical accuracy is 150 m–100 m. Yet another system is Landmark Tracking, which makes use of angular measurements of landmarks to determine both orbit and attitude. Its typical accuracy is measured in kilometers.

The most popular navigational system is Navstar, also known as the Global Positioning System (hereinafter "GPS"), which uses a network of navigation satellites. GPS is currently operational and can provide spacecraft ephemeris information for orbit determination via on-board GPS receivers and GPS receiver antennas. Attitude determination using GPS and multiple GPS antennas has also been demonstrated. The positional accuracy obtainable from GPS is in the 15 m to 100 m range depending on whether the system is using military or commercial grade data. GPS receivers receive signals from multiple GPS satellites and use the received information to solve simultaneously for the three components of the observer's position and the current time. This information is continually updated, providing position and velocity information, which is in turn used to determine orbital parameters. The GPS constellation is at approximately half-geosynchronous altitude and works best for LEO satellites. Since GPS is operationally proven and at least as accurate as other known navigational systems, it is commonly used.

However, two significant problems with GPS are reliability and cost. The potential lack of availability of the GPS satellites for even a short period due to either geometrical circumstances, the failure of one of more of the GPS satellites, or the failure of the on-board GPS receiver is a major concern for an expensive spacecraft which depends on GPS for attitude and positional determination. In addition, space grade GPS receivers can be prohibitively expensive, particularly since satellite systems in need of accurate positional data generally employ redundant GPS receivers on-board each satellite. The additional expense of a redundant GPS receiver, particularly to each satellite in a satellite constellation potentially comprising dozens of satellites with limited lifespans, is substantial. One motivation for the current invention is to provide a method and apparatus which would effectively serve as a backup to an expensive primary navigational system such as GPS.

A need has long existed for an improved satellite attitude and ephemeris determination system.

SUMMARY OF THE INVENTION

It is an object of the present invention to provide an ephemeris and attitude determination system which utilizes existing satellite subsystems.

It is another object of the present invention to provide an ephemeris and attitude determination system which utilizes existing satellite subsystems and inherent characteristics of satellite communication networks.

It is a further object of the present invention to provide an attitude and ephemeris determination system which determines the attitude and ephemeris for a spacecraft based on the ephemeris of crosslinked spacecraft.

It is yet another object of the present invention to provide an attitude and ephemeris determination system which determines the attitude and ephemeris for a spacecraft based on the ephemeris of crosslinked spacecraft and crosslink sensor pointing information.

One or more of the foregoing objects are met in whole or in part by a preferred embodiment of the present invention that provides a method and apparatus for the determination of the attitude and ephemeris of a satellite. For ephemeris determination, reference ephemeris information on crosslinked spacecraft is obtained. The reference ephemeris information is preferably received from the actual crosslinked spacecraft. Crosslink sensor pointing information is also obtained from resolvers attached to antenna assembly steering motors. Attitude reference for the spacecraft may be obtained from the satellite's attitude determination subsystem, and an on-board clock supplies time information. Ephemeris determination algorithms then calculate the satellite's ephemeris based on the reference ephemeris information, crosslink sensor pointing information, attitude reference and time information. The Ephemeris determination algorithms preferably employ Kalman filtering and ephemeris propagation.

Similarly, for attitude determination, reference ephemeris information on crosslinked spacecraft is obtained. The reference ephemeris information is preferably received from the crosslinked spacecraft themselves. Crosslink sensor pointing information is obtained from resolvers attached to antenna assembly steering motors, and an on-board clock supplies time information. Attitude determination algorithms then calculate the satellite's attitude based on the reference ephemeris information, crosslink sensor pointing information and time information. As with ephemeris, the attitude determination algorithms preferably employ Kalman filtering and attitude propagation.

DETAILED DESCRIPTION OF THE PREFERRED EMBODIMENT

Figure 1:
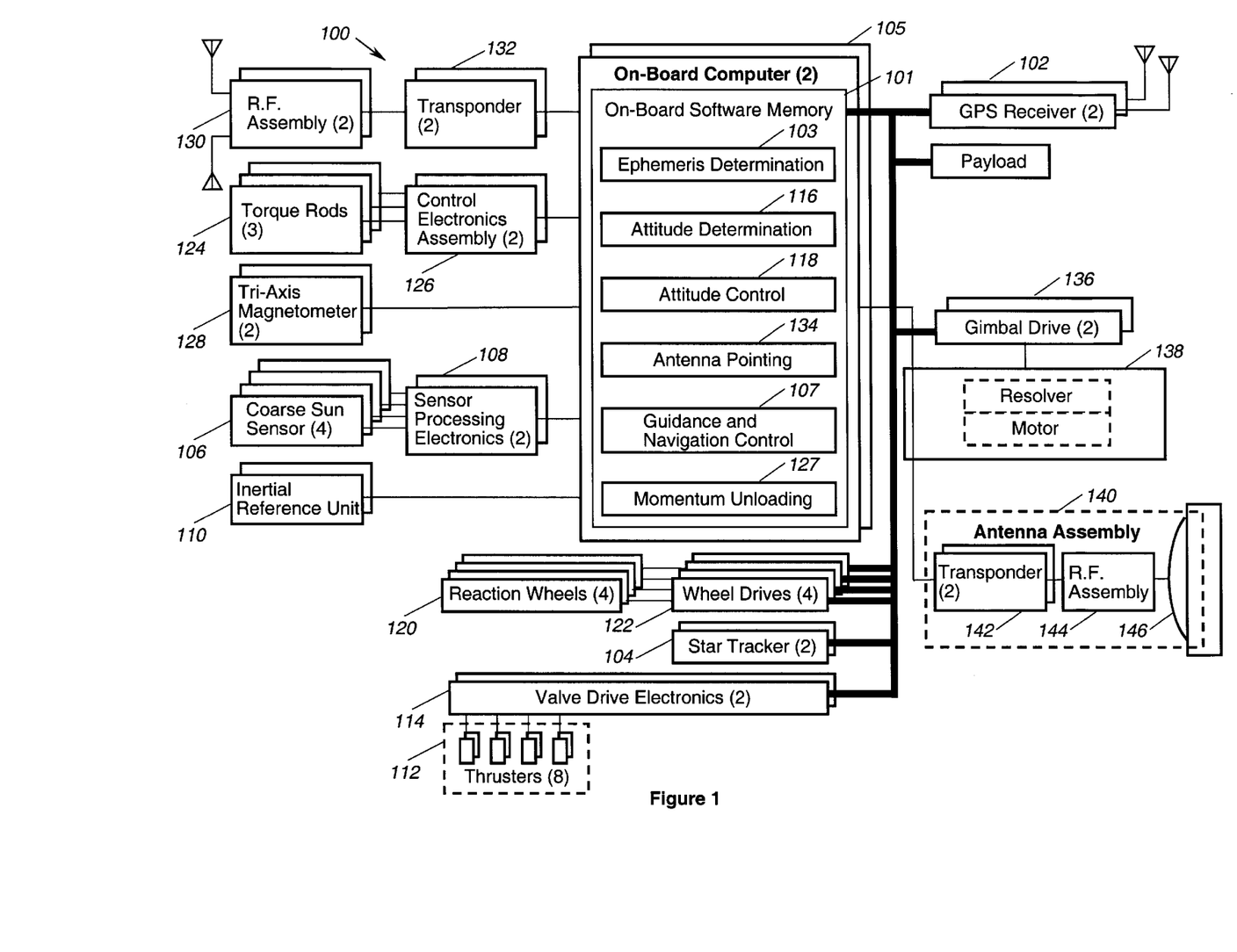
FIG. 1 illustrates a typical on-board satellite system with RF crosslinking and redundant GPS receivers.

FIG. 1 illustrates a block diagram of a typical LEO satellite system 100. The satellite system 100 contains ephemeris determination components which determine the orbital position for the satellite system 100 as a function of time. The satellite system 100 acquires its ephemeris information from a pair of GPS receivers 102, one of which is redundant. One of the motivations underlying the present invention is to reduce the prohibitive cost of space grade GPS receivers. The elimination of one or both of the GPS receivers 102 from the satellite system 100 results in a substantial cost savings. On-board ephemeris determination software 103 resides in a memory 101 coupled to the on-board computer 105 and is provided to monitor the ephemeris and propagate the ephemeris between GPS readings. Once the ephemeris has been determined, it is sent to the guidance and navigation control software 107, which compares the determined ephemeris to the desired ephemeris. If necessary, adjustments to the orbit are made using the thrusters 112 and their control electronics 114.

The satellite system 100 also includes attitude reference determination components, which determine the attitude of the spacecraft. The satellite system 100 illustrated in FIG. 1 may, for example, include a star tracker 104 for attitude determination. Coarse sun sensors 106 and accompanying electronics 108 may also be included for coarse attitude reference determination and are typically used when spacecraft anomalies occur and more accurate sensors, such as the star tracker 104, may not be functioning properly.

In order to propagate attitude between sensor readings or when access to the stars is not available, an inertial reference unit 110 (e.g. a gyro) is included. The inertial reference unit 110 and star tracker 104 are linked to on-board attitude determination software 116. The attitude determination software 116 determines and tracks attitude, propagates attitude between sensor readings, and provides attitude information to the attitude control software 118. In turn, the attitude control software 118 sends signals to the attitude control hardware which executes the desired attitude adjustments. The attitude control hardware for the satellite system 100 illustrated in FIG. 1 includes reaction wheels 120 and their associated drives electronics 122. Accelerating and decelerating the reaction wheels 120 induces torques on the satellite body due to conservation of angular momentum. The induced torques, in turn, cause the satellite body to rotate in the desired directions.

During its lifetime, the satellite is exposed to attitude perturbing torques. The torques may be due to solar pressure, atmospheric drag, gravity gradient, the Earth's magnetic field, and other causes. As noted above, the attitude control system compensates for these torques using the reaction wheels 120. However, if the torques do not average out over time, the angular velocity of the reaction wheels 120 will continually increase. Eventually, the angular velocity of the reaction wheels 120 may exceed some maximum limit. Momentum unloading components are typically provided to address this concern.

For example, the satellite system 100 may include torque rods 124 and their respective controllers 126 which act in conjunction with the Earth's magnetic field to impart torques on the spacecraft. A magnetometer 128 is used to sense the Earth's magnetic field. Momentum unloading software 127 then controls currents in the torque rods to generate compensating torques, which in turn result in attitude control system slowing down the reaction wheels 120.

An omni-directional RF assembly 130 and a transponder 132 are provided to enable communication with the spacecraft regardless of the satellite attitude or sensor orientations. Other communication components may also be provided for maintaining crosslinks to other spacecraft and downlinks to earth stations. The antenna pointing software 134 controls the antenna pointing angles by sending commands to a set of gimbal drives 136 which control a gimbal drive assembly 138 comprising motors and resolvers. Although resolvers are discussed below as the pointing direction measuring apparatus for the preferred embodiment, there are many other devices, such as optical encoders, that may be used to supply pointing direction information. The antenna pointing software 134, gimbal drive 136, and gimbal drive assembly 138 make up the sensor pointing direction controller of the preferred embodiment.

The gimbal drive assembly 138 positions the antenna assembly 140 (including the transponders 142, an RF assembly 144 and an antenna 146). The antenna assembly 140 is positioned so that the antenna 146 points toward the entity being communicated with, which may be an earth station for uplink/downlink communication or another spacecraft for crosslink communication.

Figure 2:
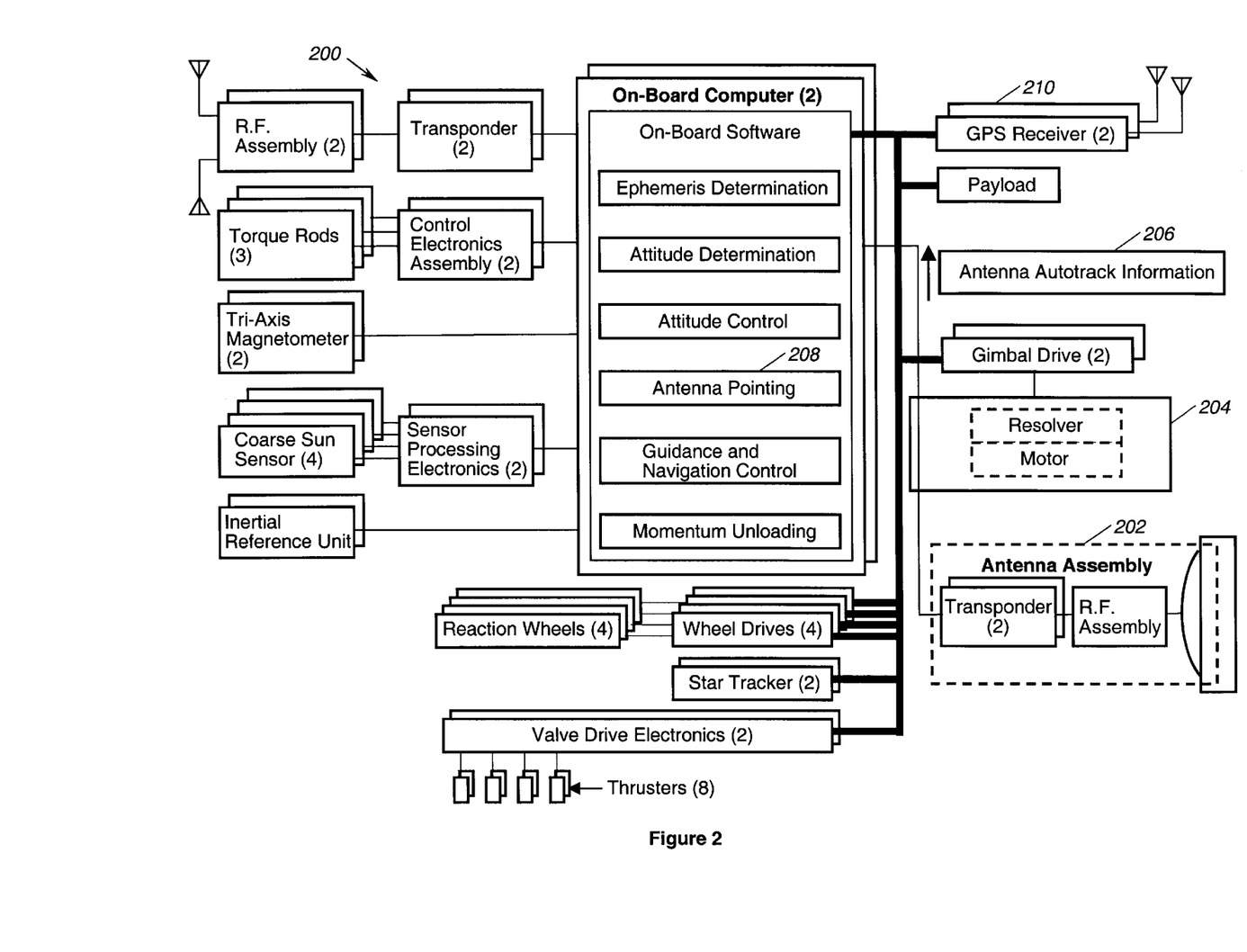
FIG. 2 illustrates a typical on-board satellite system with RF crosslinking, antenna autotracking and redundant GPS receivers.

A slightly more complex satellite system 200 is illustrated in FIG. 2. In satellite communication systems where RF beamwidths are relatively narrow, or in optically linked systems with inherently narrow beamwidths, autotracking functionality is often provided. The antenna assembly 202 and gimbal drive assembly 204 send antenna autotrack information 206 to the antenna pointing software 208, which may then fine tune the pointing direction of the antenna assembly 204.

There are several methods for autotracking, including mono-pulse and dithering. One method measures signal amplitude while performing a dithering motion with the antenna. The antenna pointing angle resulting in the strongest received signal is chosen. The preferred embodiment of the present invention incorporates autotracking for improved sensor pointing accuracy.

Figure 3:
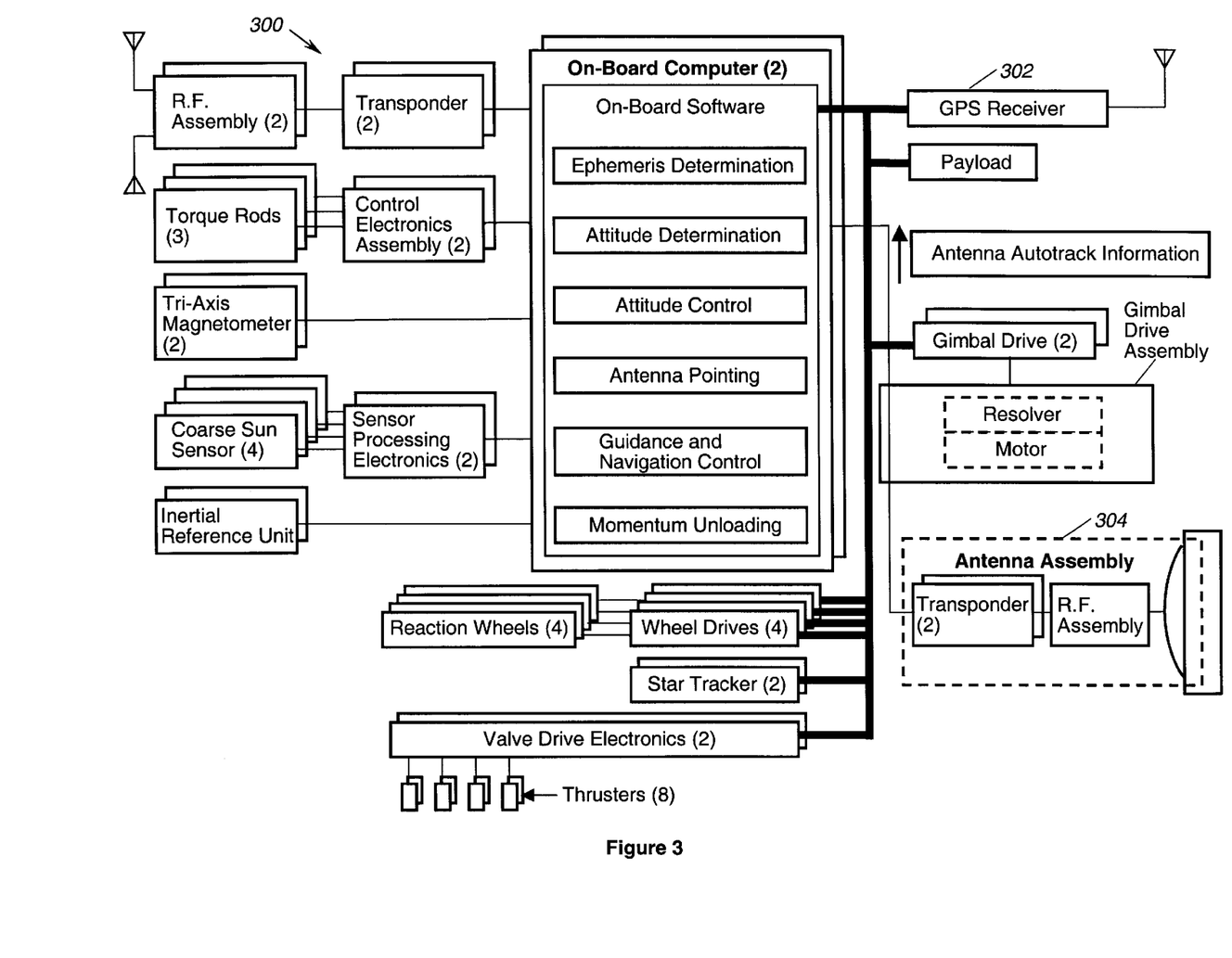
FIG. 3 illustrates a satellite communication system incorporating an ephemeris determination subsystem according to a preferred embodiment of the present invention.

FIG. 3 illustrates a satellite communication system 300 incorporating an ephemeris determination subsystem according to a preferred embodiment of the present invention. A single GPS receiver 302, rather than a redundant pair, is utilized for primary ephemeris determination. The backup ephemeris determination subsystem utilizes knowledge of the ephemeris of other satellites and sensor pointing information to determine the ephemeris of the satellite. A GPS failure would effectively render useless the GPS receiver 302. Therefore, another mechanism for calculating satellite ephemeris utilizing the remaining functional components on-board the satellite is required.

Figure 4:
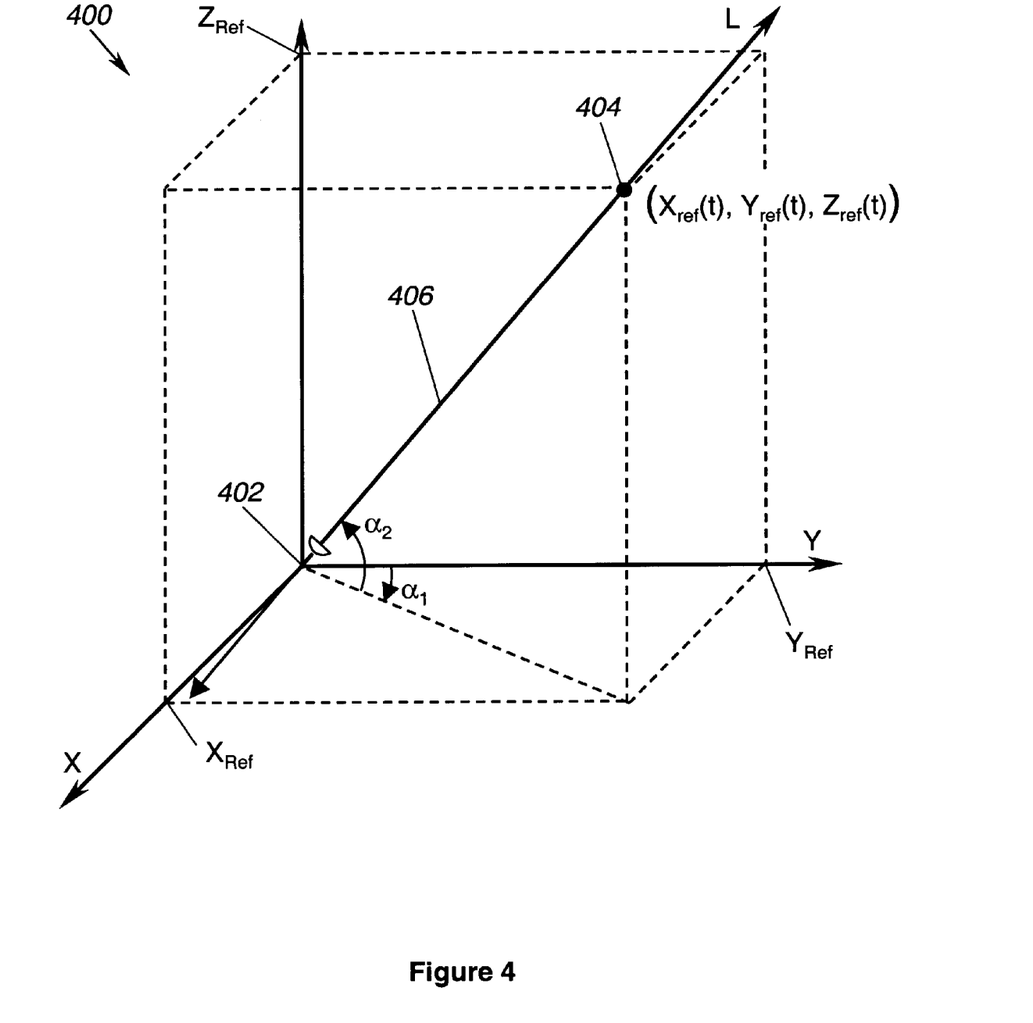
FIG. 4 is a three-dimensional space diagram illustrating the concept of sensor pointing direction.

Turning to FIG. 4, that figure shows a diagram illustrating the concept of sensor pointing direction. A three-dimensional space 400 is illustrated including a satellite 402 at the origin. Even though the satellite 402 may no longer be receiving GPS information, the satellite 402 is able to propagate its ephemeris using orbital models. Thus, for a period of time, the satellite 402 is able to propagate its own ephemeris. In addition, through ephemeris propagation techniques, the satellite 402 knows approximately where the satellites (e.g., the reference satellite 404) to which it would normally crosslink are located. If a crosslink to the reference satellite 404 has not already been established, the satellite 402 establishes the crosslink. Autotracking is then used to point to and determine the direction of the crosslinked satellite 404 as accurately as possible. The sensor pointing angles, $\alpha 1$ and $\alpha 2$, are used as an indication of the direction of the crosslinked satellite 404. In addition to the sensor pointing angles, $\alpha 1$ and $\alpha 2$, the satellite 402 also obtains the ephemeris ($x_{ref}(t)$, $y_{ref}(t)$ and $z_{ref}(t)$) of the crosslinked satellite 404. This ephemeris information may either be received from the crosslinked satellite 404 via the crosslink or from a ground station via an uplink.

The distance 406 from the satellite 402 to the crosslinked satellite 404 is unknown. However a line pointing from the satellite 402 to the crosslinked satellite 404 can be defined by the ephemeris ($x_{ref}(t)$, $y_{ref}(t)$ and $z_{ref}(t)$) of the crosslinked satellite 404 and the two sensor pointing angles, $\alpha 1$ and $\alpha 2$.

In ephemeris determination, the satellite determines its coordinates in three-dimensional space using a particular coordinate system. For the preferred embodiment, as illustrated in FIG. 3, the satellite system 300 has an independent and functional attitude reference and control system. Thus the satellite knows its orientation in space, and only needs to determine its location.

To solve for the satellite coordinates, three independent equations involving only the three unknowns may be used. In FIG. 4, the sensor pointing angles ($\alpha 1$ and $\alpha 2$) were determined along with the ephemeris ($x_{Xref}(t)$, $y_{ref}(t)$ and $z_{ref}(t)$) of the crosslinked satellite 404. This information, combined with the satellite's knowledge of its own attitude is enough information to determine a line in three-dimensional space containing the satellite 402 and the reference satellite 404. Additional information will be used to determine the satellite's exact position on that line.

One option is to measure the sensor pointing angles to the crosslinked satellite 404 at another point in time. Because the satellite 402 knows the expected orbit of the crosslinked satellite 404, and that orbit has substantial components non-parallel to the orbit of the satellite 402, a second sensor pointing angle measurement provides adequate information to solve for the satellite 402 coordinates.

Figure 5:
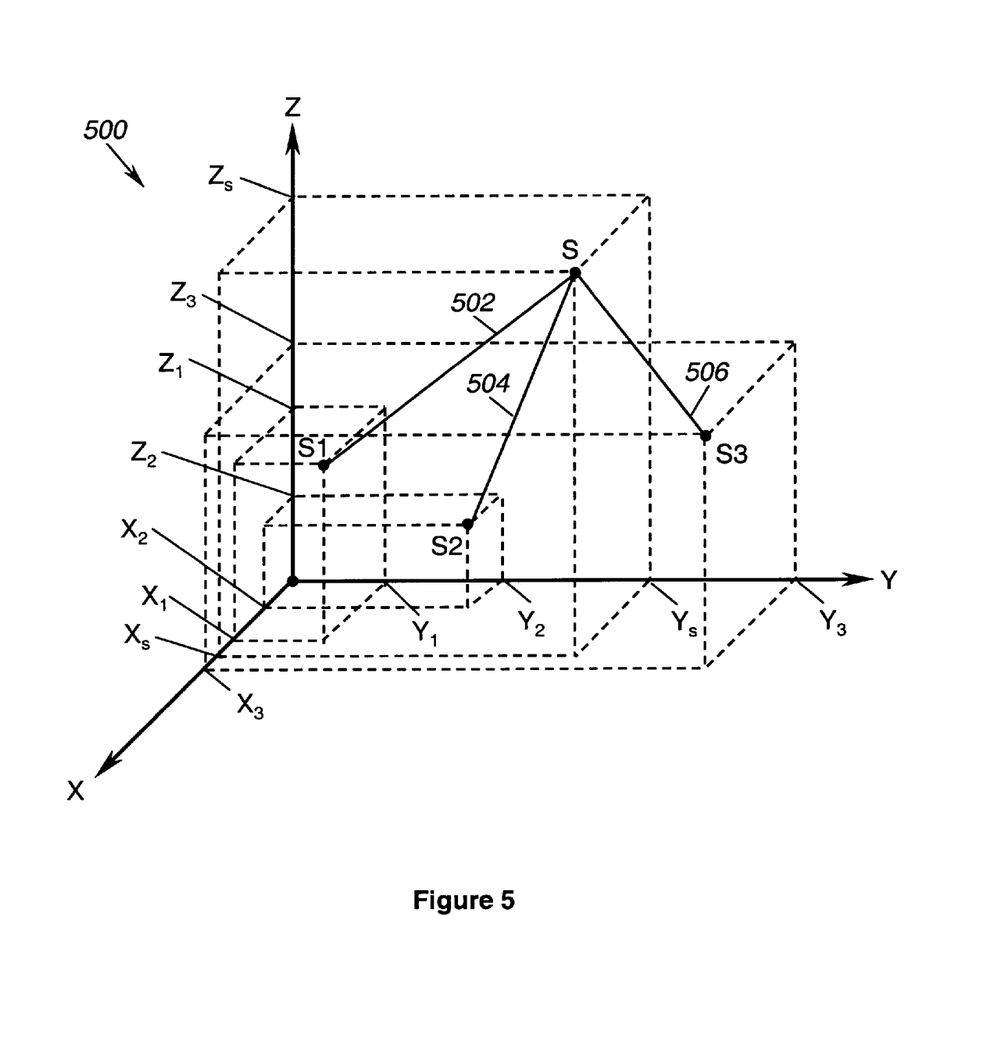
FIG. 5 is a three-dimensional space diagram illustrating an ephemeris determination scenario.

Another preferred option involves crosslinks to multiple satellites. FIG. 5 illustrates an ephemeris determination scenario in three-dimensional space 500 involving a satellite S with three crosslinks (502, 504 and 506) to three crosslinked satellites (S1, S2 and S3 respectively). The satellite S knows the ephemeris for each of the crosslinked satellites (S1, S2 and S3) at a point in time. The satellite also knows the sensor pointing angles for its crosslink sensors. The satellite S may thus solve for its location using established trigonometric relationships. Multiple location determinations over time may then be used to determine spacecraft ephemeris. In the situation illustrated in FIG. 5, while it is not necessary for the satellite S to knows its own attitude, the attitude should be constant over the measurement time interval. However, additional information, such as the satellite's attitude, measurements of crosslink sensor angles at different points in time, ranging information, and positions of other bodies, such as the Earth, may be used to increase the fidelity of the ephemeris calculation.

Figure 6:
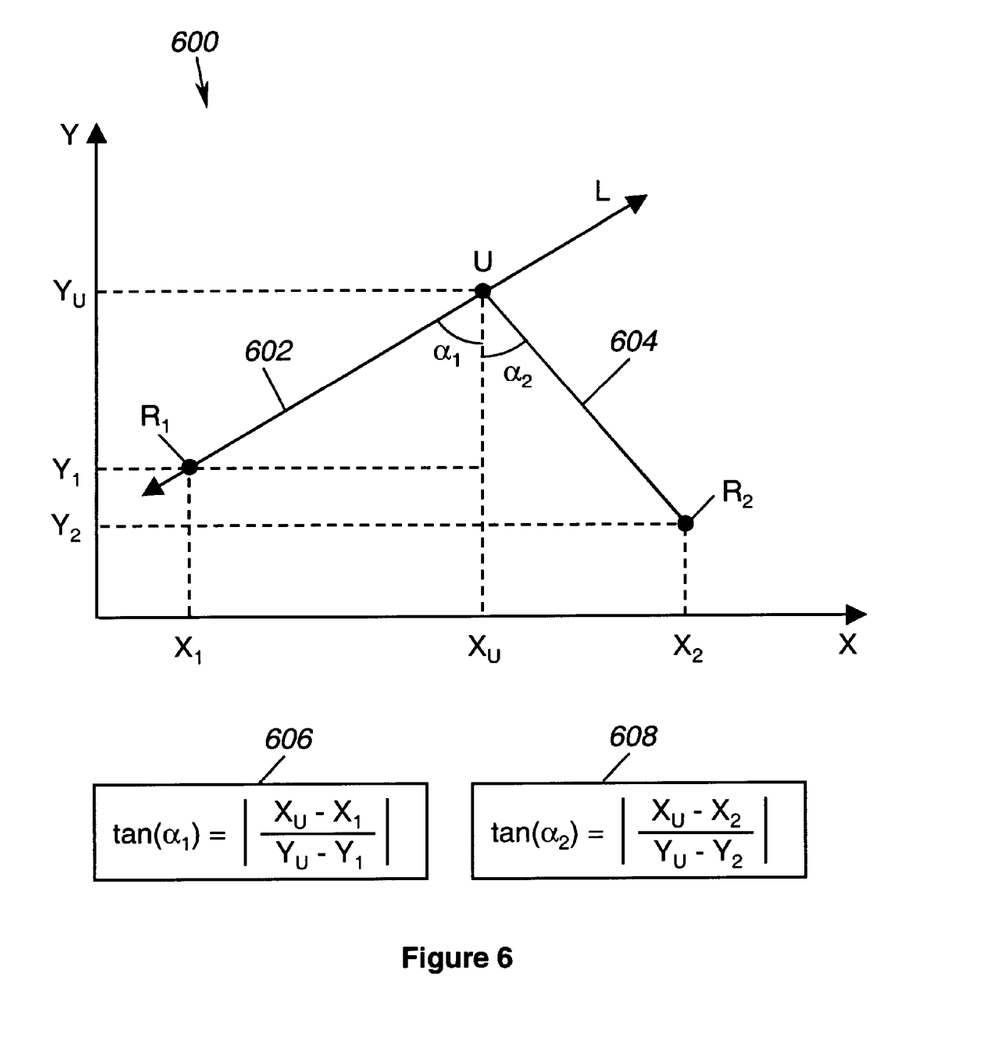
FIG. 6 is a two-dimensional space diagram illustrating an ephemeris determination scenario.

FIG. 6 shows a two-dimensional space 600 to illustrate the determination of ephemeris. Initially, the satellite U establishes a crosslink 602 to a first crosslinked satellite R1. For this example, the satellite U knows its attitude, so it knows where the X and Y directions are. The sensor angle α1 for the crosslink 602 between the satellite U and the first crosslinked satellite R1 is measured. The satellite U also obtains the ephemeris for the first crosslinked satellite R1, so the satellite U is able to define a line L in two-dimensional space between the satellite U and the first crosslinked satellite R1. The satellite U establishes a second crosslink 604 to a second crosslinked satellite R2. The sensor angle α2 for the crosslink 604 between the satellite U and the second crosslinked satellite R2 is measured, and the ephemeris of the second crosslinked satellite R2 is obtained. The result is the two equations (606 and 608) for two unknowns, $X_u$ and $Y_u$ shown in FIG. 6, which may be readily solved by on-board ephemeris determination software using established trigonometric relationships.

Figure 7:
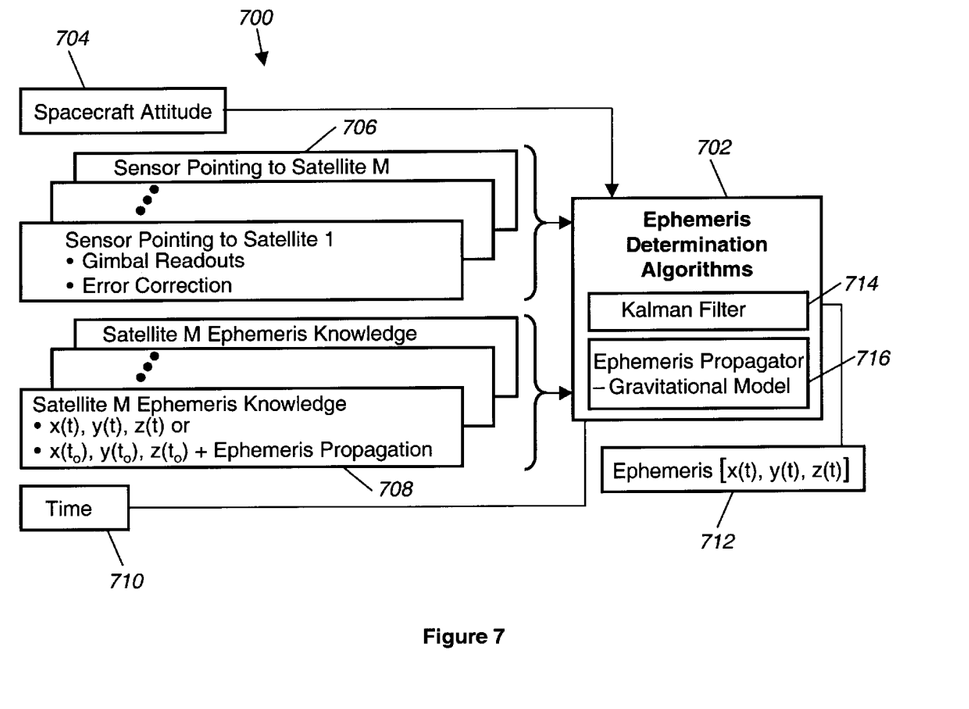
FIG. 7 illustrates an ephemeris determination system according to a preferred embodiment of the present invention.

FIG. 7 illustrates an ephemeris determination 700 approach according to a preferred embodiment of the present invention. The ephemeris determination algorithms 702 accept the spacecraft attitude 704 as input. Sensor pointing angles for crosslinks are measured and the information 706 is provided to the ephemeris determination algorithms 702. In addition, ephemeris information for each crosslinked satellite is obtained 708 and input to the ephemeris determination algorithms 702. Finally, time 710 is also input to the ephemeris determination algorithms 702. The ephemeris determination algorithms 702 calculate the ephemeris for the satellite based on the input information (704, 706, 708 and 710).

The ephemeris determination algorithms 702 preferably include a Kalman filter so that past information and determinations can be used to increase the fidelity of the current ephemeris determination. In addition, the ephemeris determination algorithms 702 preferably contain an ephemeris propagator for use in conjunction with the Kalman filter, including a gravitational model, for the propagation of ephemeris between external inputs and optionally for the propagation of the ephemeris of crosslinked spacecraft. The output of the ephemeris determination algorithms 702 comprises the determined ephemeris 712 for the satellite.

Figure 8:
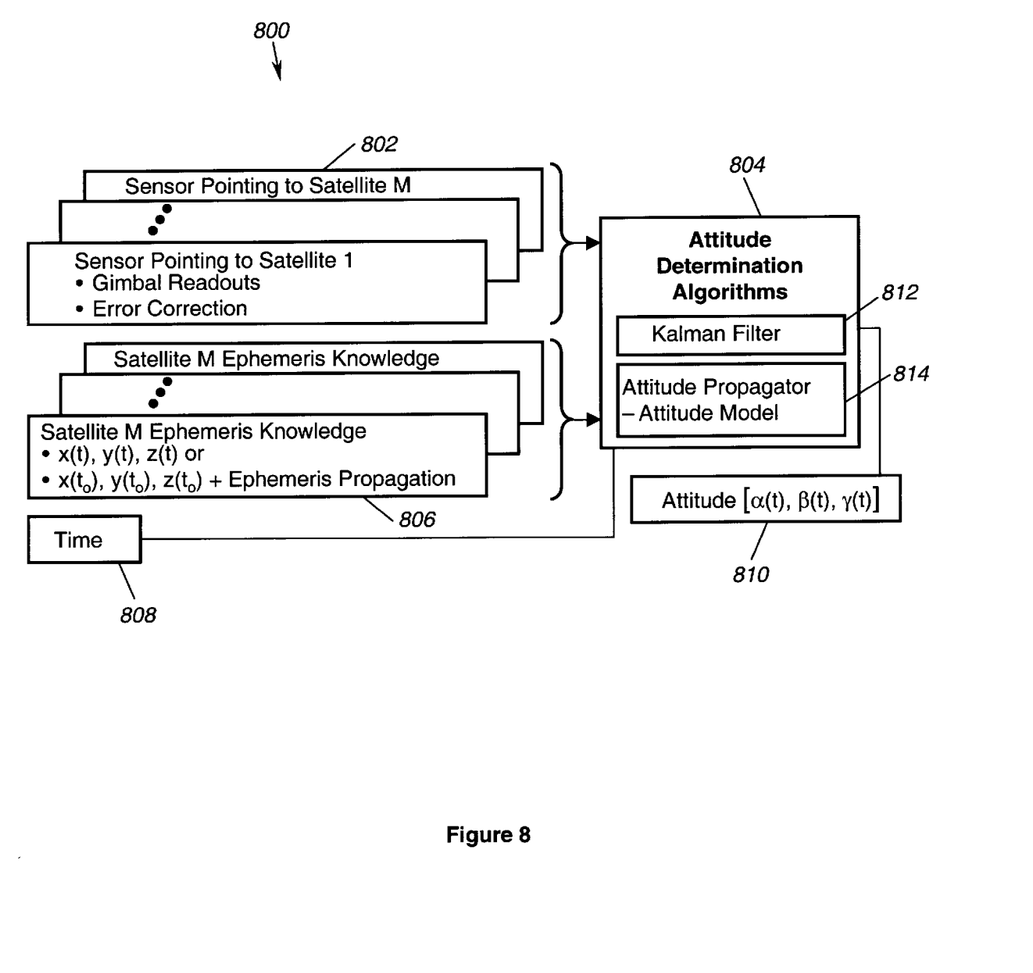
FIG. 8 illustrates an attitude determination system according to a preferred embodiment of the present invention.

FIG. 8 illustrates attitude determination 800 according to a preferred embodiment of the present invention. Sensor pointing angles for crosslinks are measured and the information 802 is provided to the attitude determination algorithms 804. Attitude information for each crosslinked satellite is also obtained 806 and input to the attitude determination algorithms 804. In addition, time 808 is input to the attitude determination algorithms 804. The attitude determination algorithms 804 calculate the attitude for the satellite based on the input information (802, 806 and 808).

The attitude determination algorithm 804 preferably includes a Kalman filter so that past information and determinations can be used to increase the fidelity of the current attitude determination. In addition, the attitude determination algorithms 804 preferably contain an attitude propagator for use in conjunction with the Kalman filter, including an attitude predicting model, for the propagation of attitude between external inputs.

Figure 9:
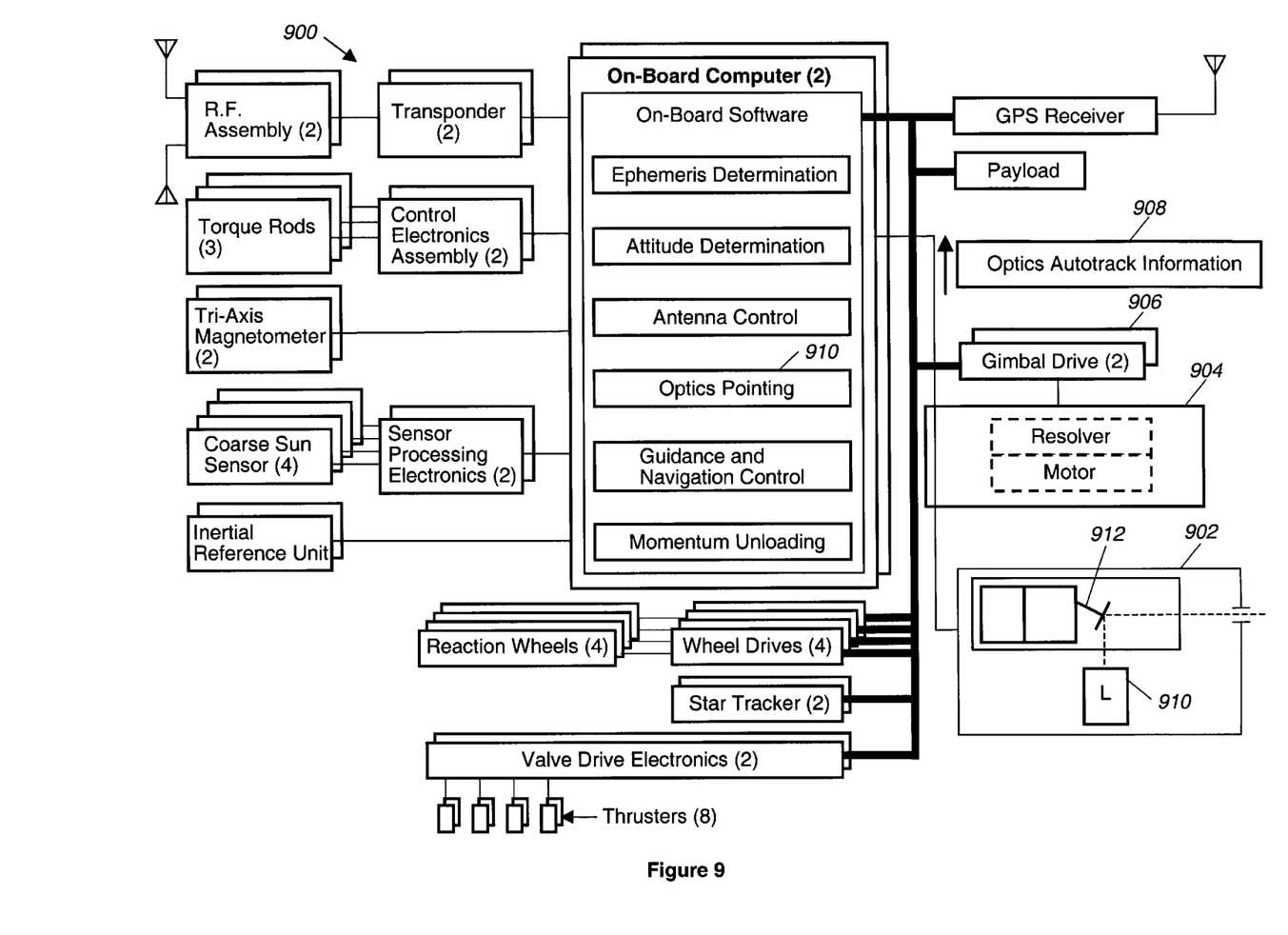
FIG. 9 illustrates an on-board satellite system with optical crosslinking, antenna autotracking and a single GPS receiver according to an alternative embodiment of the present invention.

Although the crosslink sensor assembly chosen for the preferred embodiment (illustrated in FIG. 3) used a RF antenna assembly, an alternative embodiment may implement optical crosslinks. FIG. 9 illustrates an alternative embodiment of the present invention 900 including an optical sensor assembly 902. As in the preferred embodiment, the sensor assembly 900 is positioned with a gimbal drive assembly 904, which is in turn controlled by a gimbal drive 906. Optics autotrack information is provided to the on-board optics pointing software 908, which sends pointing commands to the gimbal drive 906. The optical sensor assembly preferably includes a laser 910 and a fast steering mirror 912, which performs fine pointing adjustments and raster scans the field of view for the optimal signal reception.

The method and apparatus of the present invention utilizes existing satellite subsystems to determine ephemeris and attitude for a satellite. The present invention provides a low-cost alternative to expensive satellite ephemeris determination subsystems (e.g., GPS). The present invention can either serve as a primary ephemeris and/or attitude determination subsystem or a secondary system. The ephemeris and/or attitude information produced by the present invention may also be used to augment ephemeris and attitude information obtained from other sources, thereby increasing the accuracy of ephemeris and attitude calculations.

While particular elements, embodiments and applications of the present invention have been shown and described, it will be understood that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for determining ephemeris for a spacecraft, the method comprising:
   obtaining ephemeris data for reference spacecraft crosslinked to said spacecraft;
   obtaining crosslink sensor pointing information for at least one crosslink between said spacecraft and said reference spacecraft; and
   determining ephemeris for said spacecraft based on said ephemeris data and said crosslink sensor pointing information.

2. The method of claim 1 further comprising obtaining attitude for said spacecraft, and wherein said step of determining ephemeris comprises determining ephemeris for said spacecraft based on said ephemeris data, said crosslink sensor pointing information and said attitude.

3. The method of claim 2 wherein said step of obtaining attitude for said spacecraft comprises obtaining said attitude for said spacecraft from an on-board attitude reference system.

4. The method of claim 2 wherein said step of obtaining attitude for said spacecraft comprises determining said attitude for said spacecraft based on said ephemeris data and said crosslink sensor pointing information.

5. The method of claim 1 wherein said step of obtaining ephemeris data comprises receiving said ephemeris data from said reference spacecraft via said crosslinks.

6. The method of claim 1 wherein said step of obtaining ephemeris data comprises receiving said ephemeris data from a ground station via an uplink between said spacecraft and said ground station.

7. The method of claim 1 wherein said step of obtaining crosslink sensor pointing information comprises obtaining said crosslink sensor pointing information from pointing direction measuring apparatus on-board said spacecraft.

8. The method of claim 1 wherein said step of obtaining crosslink sensor pointing information comprises obtaining said crosslink sensor pointing information from said reference spacecraft.

9. The method of claim 1 further comprising propagating said determined ephemeris with a Kalman filter.

10. The method of claim 1 wherein said step of obtaining ephemeris data comprises obtaining ephemeris data for at least two crosslinked satellites.

11. A method for determining attitude of a spacecraft, the method comprising:

obtaining ephemeris data for reference spacecraft crosslinked to said spacecraft;

obtaining crosslink sensor pointing information for at least one crosslink between said spacecraft and said reference spacecraft; and determining attitude for said spacecraft based on said ephemeris data and said crosslink sensor pointing information.

12. The method of claim 11 wherein said step of obtaining ephemeris data comprises receiving said ephemeris data from said reference spacecraft via said crosslinks.

13. The method of claim 11 wherein said step of obtaining ephemeris data comprises receiving said ephemeris data from a ground station via an uplink between said spacecraft and said ground station.

14. The method of claim 11 further comprising propagating said determined attitude with a Kalman filter.

15. The method of claim 11 wherein said step of obtaining ephemeris data comprises obtaining ephemeris data for at least two crosslinked satellites.

16. A spacecraft ephemeris determination system comprising:

a computer coupled to a memory, said memory storing ephemeris determination instructions that operate on crosslink sensor pointing data and reference spacecraft ephemeris data;

a sensor assembly comprising at least one crosslink sensor, wherein said crosslink sensor points to at least one reference spacecraft and senses crosslink signals sent from said reference spacecraft;

a sensor pointing direction controller connected to said crosslink sensor for determining said crosslink sensor pointing data for said crosslink sensor and including a crosslink sensor pointing output coupled to said computer; and a receiver which receives as input said reference spacecraft ephemeris data of crosslinked spacecraft, and outputs said reference spacecraft ephemeris data to said computer.

17. The ephemeris determination system of claim 16, wherein said crosslink sensors are RF sensors.

18. The ephemeris determination system of claim 16, wherein said crosslink sensors are optical sensors.

19. The ephemeris determination system of claim 16, wherein said crosslink signals comprise reference satellite ephemeris data, and wherein said sensor assembly sends said crosslink signals to said receiver.

20. The ephemeris determination system of claim 16, further comprising an uplink sensor which senses uplink signals comprising reference satellite ephemeris information sent from a ground station.

21. The ephemeris determination system of claim 16, further comprising an attitude reference subsystem which provides attitude reference data for said spacecraft to said computer, and wherein said ephemeris determination instructions further operate on said attitude reference data.

22. A spacecraft attitude determination system comprising:

a computer coupled to a memory, said memory storing attitude determination instructions that operate on reference spacecraft ephemeris data and crosslink sensor pointing data;

a sensor assembly comprising at least one crosslink sensor, wherein said crosslink sensor points to one or more reference spacecraft and senses crosslink signals sent from said reference spacecraft;

a sensor pointing direction controller connected to said crosslink sensors for determining said crosslink sensor pointing data for said crosslink sensors and including a crosslink sensor pointing output coupled to said computer; and a receiver which receives as input said reference spacecraft ephemeris data of crosslinked spacecraft, and outputs said reference spacecraft ephemeris data to said central computer.

23. The attitude determination system of claim 22, wherein said crosslink sensors are RF sensors.

24. The attitude determination system of claim 22, wherein said crosslink sensors are optical sensors.

25. The attitude determination system of claim 22, wherein said crosslink signals comprise reference satellite ephemeris data, and wherein said sensor assembly sends said crosslink signals to said receiver.

26. The attitude determination system of claim 22, further comprising an uplink sensor which senses uplink signals comprising reference satellite ephemeris data sent from a ground station.

27. The attitude determination system of claim 22, further comprising an ephemeris reference subsystem which provides ephemeris reference data to said computer, and wherein said attitude determination instructions further operate on said ephemeris reference data.

\* \* \* \* \*